United States Patent
Corva et al.

(10) Patent No.: US 6,396,251 B2
(45) Date of Patent: May 28, 2002

(54) CONSTANT-FREQUENCY CONTROL CIRCUIT FOR A SWITCHING VOLTAGE REGULATOR OF THE HYSTERETIC TYPE

(75) Inventors: Giulio Corva, Valdagno; Alessandro Camera, Savona; Ignazio Bellomo, Ponte Sesto Rozzano, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/800,759

(22) Filed: Mar. 6, 2001

(30) Foreign Application Priority Data

Mar. 7, 2000 (IT) .......................................... MI20A0444

(51) Int. Cl.[7] ................................................ G05F 1/56

(52) U.S. Cl. ...................................... 323/283; 323/284

(58) Field of Search ................................ 323/222, 282, 323/283, 284, 285

(56) References Cited

U.S. PATENT DOCUMENTS

| | | | | |
|---|---|---|---|---|
| 4,465,967 A | * | 8/1984 | Tokunaga et al. | 323/285 |
| 5,757,174 A | * | 5/1998 | Ki | 323/284 |
| 5,825,165 A | | 10/1998 | Kitching et al. | 323/282 |

* cited by examiner

*Primary Examiner*—Jessica Han
(74) *Attorney, Agent, or Firm*—Lisa K. Jorgenson; Seed IP Law Group PLLC (57) ABSTRACT

The invention relates to a control circuit for a hysteretic switching voltage regulator, which comprises a logic circuit driving an output stage; a hysteresis comparator comparing the voltage value at the output of the regulator with a reference voltage; a current sensor for sensing, through a comparator, the current drain of a load connected to the output of the regulator. This control circuit further comprises a device for adjusting the hysteresis range of the hysteresis comparator, and a hysteresis frequency sensing and controlling logic portion connected to the output of the hysteresis comparator, the logic portion acting on the frequency adjusting device.

42 Claims, 5 Drawing Sheets

CONSTANT-FREQUENCY CONTROL CIRCUIT FOR A SWITCHING VOLTAGE REGULATOR OF THE HYSTERETIC TYPE

TECHNICAL FIELD

This invention relates to a constant-frequency control circuit for a switching voltage regulator of the hysteretic type. In particular, the invention relates to a control circuit for controlling a switching regulator, which circuit comprises a logic circuit driving an output stage, and a hysteresis comparator comparing the output voltage value of the regulator with a reference voltage.

BACKGROUND OF THE INVENTION

As is well known in this specific field of application, voltage regulators of the switching type are commonly utilized in the power supply to microprocessors.

The current drain to a microprocessor incorporated in a portable computer (notebook), e.g., of the battery-operated variety, is bound to jump up from near zero to a maximum value when the microprocessor is switched from a standby condition to a normal condition of operation.

Due to the parasitic resistance of a filter capacitor, connected to the output of the voltage regulator wherethrough the microprocessor is powered, the output voltage Vo of the regulator shows a drop at the leading edge of said current. In view of this, the regulator is required to respond as quickly as possible in order to regain the voltage drop.

The output stage of a switching regulator comprises a complementary pair of MOS power transistors, e.g., a high-side transistor HS and a low-side transistor LS, which are connected in series with each other. Obtaining a fast response from the switching regulator upon a drop occurring in the output voltage means essentially that the MOS transistor HS must be turned on, and the MOS transistor LS turned off, as quickly as possible.

Control circuits have been proposed in the past wherein the MOS transistor HS is turned on synchronously with a clock signal to impose a predetermined switching frequency. However, circuits to this design are regarded too slow because of a time delay Ts occurring, between a load transient and the turning on of the MOS transistor HS, which can equal the switching period.

Another requirement of a switching regulator is that it should include arrangements to reduce pulse skipping when the load current is too small. In fact, battery life is affected by the power dissipated to the switching operation.

A prior solution described in U.S. Pat. No. 5,825,165 to Micro Linear Corp., for example, proposes that the output voltage Vo present on the filter capacitor be compared with a reference voltage Vref using a hysteresis comparator. A regulator equipped with such a comparator is termed "hysteretic".

The comparator thresholds are Vref+−Vh/2.

Thus, the comparator output is utilized to drive the MOS power transistors of the regulator output stage.

The comparator switching is produced by ripple on the output voltage Vo originating from a voltage drop through the parasitic resistance of the output capacitor.

This prior solution has adequate speed of response, but the switching frequency is heavily dependent on such parameters as inductance, parasitic resistance (ESR) of the output capacitor, and input and output voltages. In addition, the switching frequency is not constant through a load transient.

SUMMARY OF THE INVENTION

According to principles of the invention, a constant-frequency control circuit for controlling a switching voltage regulator is provided. The present control circuit has structural and functional features appropriate to enable the regulator to respond promptly to any drops in the output voltage, as well as appropriate to maintain a low switching frequency while the load current is relatively small.

The circuit employs a regulator which includes a hysteresis comparator, and providing it with a closed-loop control circuit capable of holding the steady-state frequency at a predetermined reference value, irrespective of the parameters affecting the regulator operation.

The control circuit comprises a device for adjusting the hysteresis range of said hysteresis comparator. In one embodiment, it includes a hysteresis frequency sensing and controlling logic portion connected to the output of said hysteresis comparator, said logic portion being arranged to act on said hysteresis range adjusting device.

The features and advantages of the control circuit according to the invention will be apparent from the following description of an embodiment thereof, given by way of example and not of limitation with reference to the accompanying drawings.

DETAILED DESCRIPTION OF THE INVENTION

Figure 1:
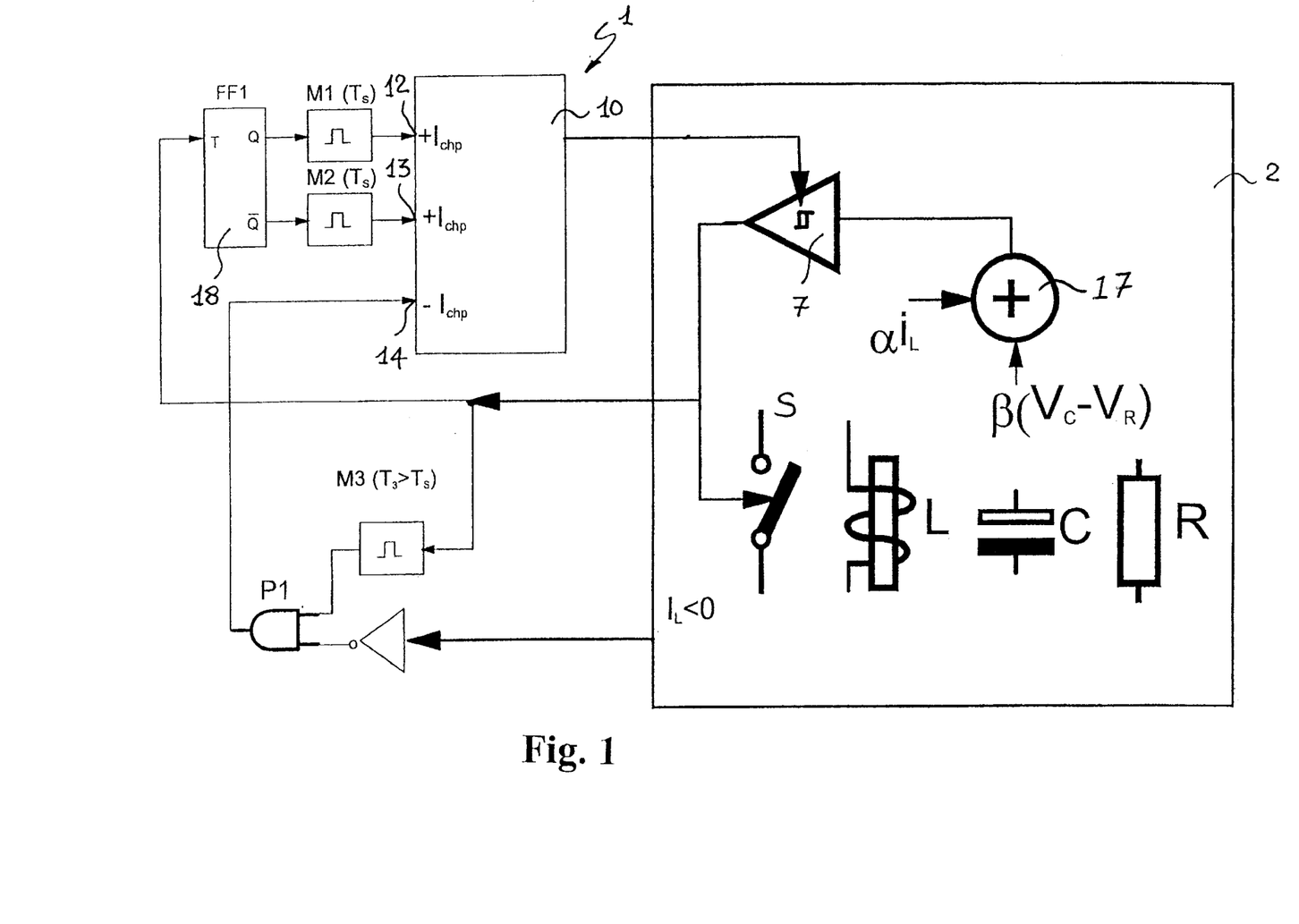
FIG. 1 shows schematically a control circuit according to the invention, as associated with a switching voltage regulator.

With reference to the drawing views, a control circuit for use with a switching voltage regulator 2, according to this invention, is generally shown at 1 in schematic form. Various regulator circuit design components are shown in schematic form, including an inductor L, a capacitor C, a resistor R, a switch S, as well as a hysteresis response circuit composed of a comparator 7 and a combination circuit 17.

Regulators 2 may be associated with microprocessors installed in battery-powered portable computers (notebooks) to regulate sharp transitions in current drain when switching from a standby state to a turned-on state. Of course, the control circuit of this invention could be alternatively associated with a switching regulator connected to drive some other electronic device in power applications.

The circuit 1 and regulator 2 is integrated in the same semiconductor integrated circuit in one embodiment. In other embodiments, it may be separate, having some external components and some integrated components on one or more chips.

Figure 2:
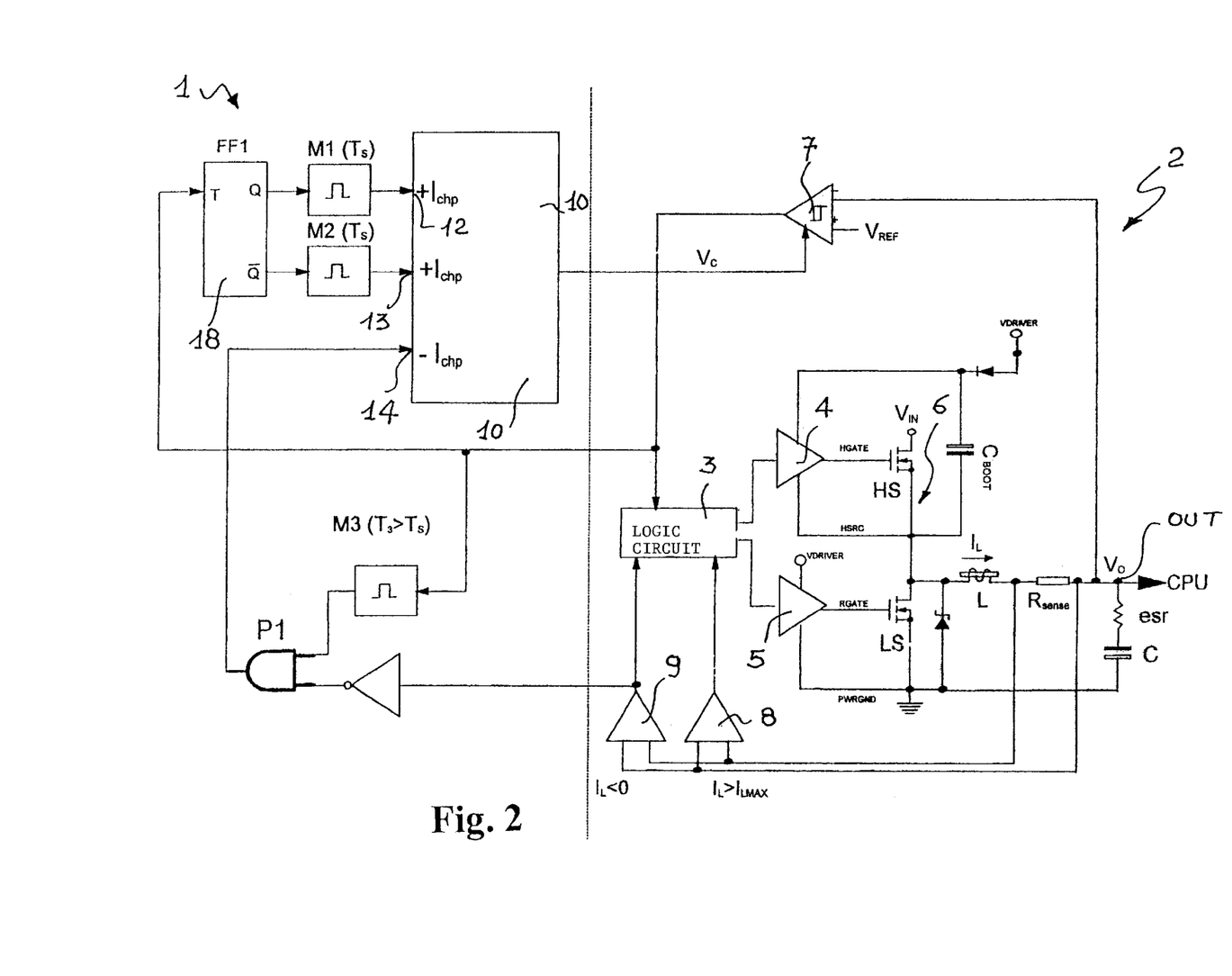
FIG. 2 shows schematically the circuit and regulator of FIG. 1 in further detail.

The regulator 2 is detailed in FIG. 2, where it is shown to comprise a logic circuit 3 and first and second drivers 4, 5 for respective MOS power transistors HS, LS of an output stage 6.

The logic circuit 3 has control outputs, each connected to a corresponding one of the drivers 4, 5.

These drivers 4, 5 are essentially amplification circuit portions whereby each control terminal of the power transistors HS, LS can be driven.

The first driver 4 is supplied a voltage Vdriver, and has its output connected directly to the gate terminal of the high-side transistor HS. For this reason, the driver 4 is also termed a high-side driver in the technical language.

The second driver 5 is supplied the voltage Vdriver, and has its output connected directly to the gate terminal of the low-side transistor LS. For this reason, the driver 5 is also termed a low-side driver in the technical language.

The MOS power transistors HS and LS are connected in series with each other between a first or supply voltage reference Vin and a second or ground voltage reference GND.

An interconnection node X is provided between these transistors HS, LS and is connected to the first driver 4.

A bootstrap capacitor is placed between the first supply voltage reference Vin and the node X.

A Schottky diode Z is placed, in parallel with the second transistor LS, between the node X and ground.

An inductor L and a sense resistor Rs are connected in series between the node X and an output terminal OUT of the regulator 2. The resistor Rs functions as a current sensor to sense the current IL absorbed by the external load of the regulator.

Derived from the terminal OUT is the output voltage value Vo, illustratively shown applied to a microprocessor CPU.

A filter capacitor having a parasitic resistance esr is provided between the output terminal OUT and the ground GND.

The regulator 2 further comprises a hysteresis comparator 7 having a first input connected to the output terminal OUT of the regulator, and having a second input arranged to receive a reference voltage Vref for comparison of the output voltage value Vo from the regulator 2.

The output of the hysteresis comparator 7 is applied to one input of the logic circuit 3.

The regulator 2 also comprises a pair of comparators 8, 9 arranged to report rising above an upper threshold which corresponds to a maximum current drain Imax of the load connected to the regulator output, and falling below a lower threshold which corresponds to a minimum current drain Io of said load.

In particular, the comparator 9 is a zero-crossing type serving a function to be explained.

The input signals to the comparators 8, 9 are derived from the ends A, B of the sense resistor Rs which is connected in the vicinity of the output terminal OUT.

More particularly, the nodes A, B are connected to either inputs of the comparators 8, 9, the output of each comparator 8, 9 being connected to a corresponding input of the logic circuit 3.

Advantageously in this invention, the control circuit 1 is designed to improve the performance of the regulator 2.

For this purpose, the circuit 1 includes a device 10 for adjusting the oscillation frequency of said hysteresis comparator. Preferably, the device 10 is a charge pump having plural control inputs.

In the illustrative embodiment herein, the charge pump 10 has at least three inputs 12, 13, 14 and a control output 15 which acts on the regulator 2, specifically on the hysteresis comparator 7 of the regulator 2.

The circuit 1 also includes a logic portion 11 for sensing and controlling the working frequency of the hysteresis comparator 7. The sensing/controlling logic portion 11 comprises a logic gate P1 and a set of memory elements.

The logic gate P1 is preferably a two-input AND gate, although the skilled person in the art will recognize that this logic gate could be arranged to perform a different logic operation.

A first input of the logic gate P1 receives the signal being output by the zero-crossing comparator 9 of the regulator 2 through an inverter 16.

The other input of the logic gate P1 receives the output signal from the hysteresis comparator 7 via a monostable element M3 characterized by having a delay period T3. Advantageously, the element M3 is a re-triggerable one.

The output of the logic gate P1 is connected to the input 14 of the charge pump 10. A control signal received on the input 14 is effective to depress the value of a current Ichp in the charge pump 10.

The output from the hysteresis comparator 7 is also applied to a setting input T of a bistable memory element 18 of the T type.

This element 18 has a first output Q connected to the input 12 of the charge pump 10 through a monostable element M1 characterized by having a delay period Ts. In a preferred embodiment, T3 is greater than Ts.

A second output $\overline{Q}$, being the inverted signal of the first output Q, of the element 18 is connected to the other input 13 of the charge pump 10 through a further monostable element M2 characterized by also having a delay period Ts.

A control signal received on the input 12 or 13 is effective to integrate the current Ichp in the charge pump 10.

Figure 3:
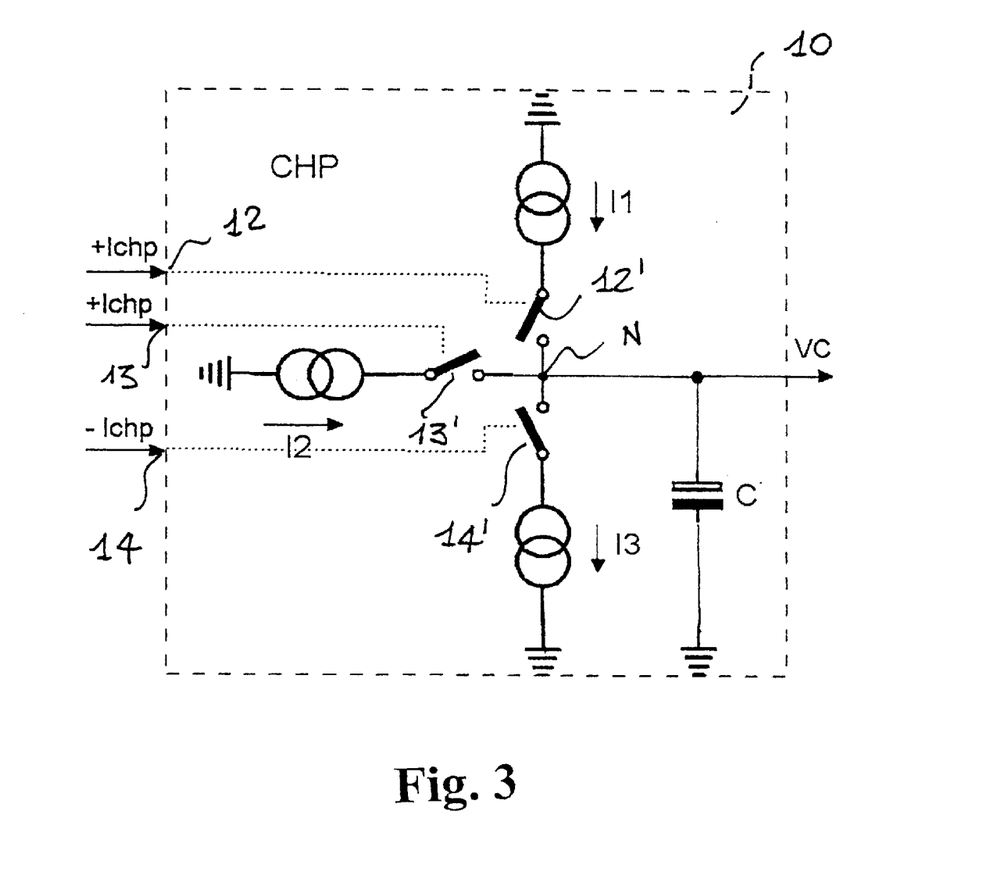
FIG. 3 is a schematic detail view of the control circuit shown in FIG. 1.

Shown schematically in FIG. 3 is the internal construction of the charge pump 10, whence it can be evinced that each input 12, 13 or 14 is essentially a normally open controlled switch 12', 13' or 14' adapted to communicate a respective current generator to a center node N of the pump 10.

More particularly, a first current generator I1 is connected in series with the switch 12' between ground GND and the node N.

A second current generator I2 is connected in series with the switch 13' between ground GND and the node N; and a third current generator I3 is connected in series with the switch 14' between ground GND and the node N. The generators I1 and I2 will pump a current to the node N, whereas the generator I3 will drain a current from the node N.

A charge capacitor C is connected in parallel with the last-mentioned series connection between the generator I3 and the switch 14'.

The output of the charge pump 10 is derived from the node N in the form of a control voltage Vc.

The operation of the control circuit 1 according to the invention will now be described.

Each time that the transistor HS in the output stage 6 is turned on, a pulse having a duration Ts (corresponding to a desired period of oscillation) is generated by means of the two monostable elements M1 and M2. These elements are controlled by the flip-flop FFI, each every two turn-on cycles of the transistor HS.

The pulses output by each monostable element M1, M2 are integrated by the charge pump 10 producing a current Ichp. Each time that the transistor HS of the regulator 2 is turned on, the monostable element M3 is controlled, whose pulse has a duration T3 slightly longer than the duration of Ts.

This pulse T3 is, in turn, integrated by means of a current -Ichp. The output from the charge pump 10 produces a voltage value Vc which is applied to the hysteresis comparator 7 of the regulator to control the width Vh of the hysteresis range of the comparator 7.

Figure 4A:
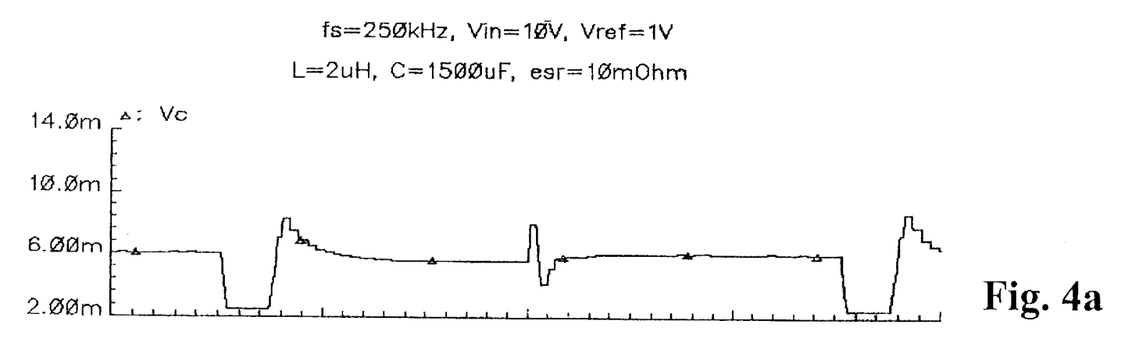
FIGS. 4A, 4B and 4C show graphs, respectively of the hysteresis range control voltage Vc, the load current IL, and the output voltage Vo, all plotted against the same time base, for the switching regulator of FIG. 1 when under a high-load condition.
Figure 4B:
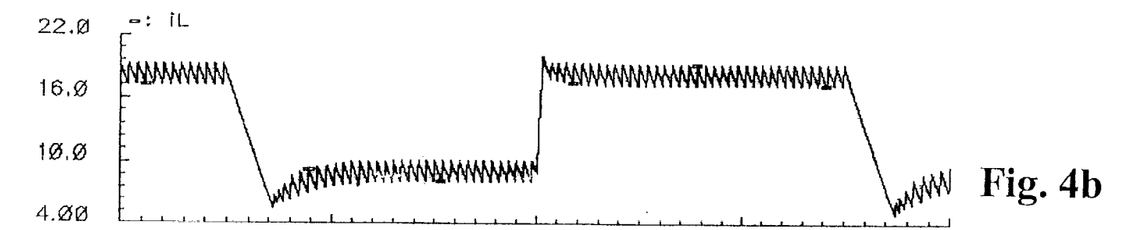
Figure 4C:
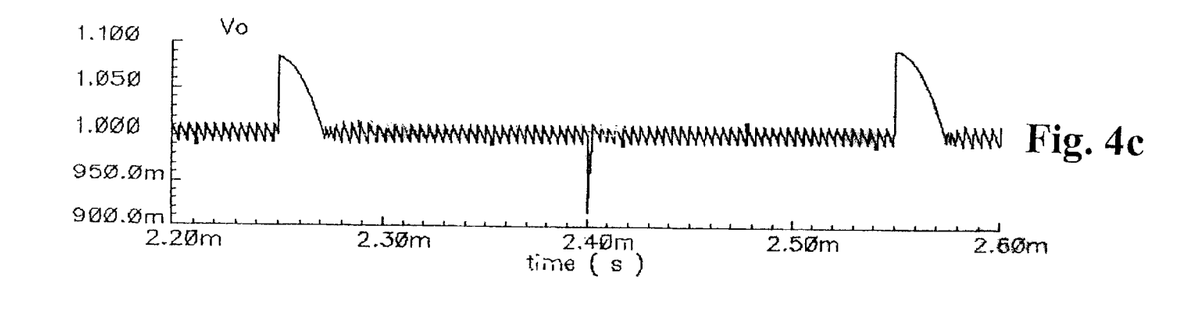

In the steady-state condition, the charge balance causes the system to oscillate at a frequency fs=1/Ts. The pulses output by the elements M1 and M2 are aligned (specifically, the output from M2 goes high at the trailing edge of M1, and vice versa), whereas the output from the element M3 is always high. With a control of this type, the control voltage Vc shows no ripple at steady-state. FIGS. 4A, 4B and 4C are graphs of the input voltage Vc, the load current IL, and the output voltage Vo, plotted against the same time base.

Upon the occurrence of a load transient, the transistor HS (or LS) stays 'on' for the time needed to bring the output voltage Vo of the regulator back within the hysteresis range. This time interval may be longer than the period Ts, so that the control voltage Vc will come down from the steady-state value and, consequently, the hysteresis range becomes narrower.

However, the output pulse from the element M3 will exhaust itself if this interval exceeds T3, thereby preventing the charge pump 10 from becoming too deeply discharged.

This control being of the first order, its stability can be quite robust.

The closed-loop frequency of the control may be chosen approximately one order of magnitude less than the frequency fs.

To set the switching frequency, it is necessary to set the duration of the pulse from the monostables M1, M2 and M3, such as by altering a reference current from outside the integrated circuit which contains the regulator 2.

Figures 5A, 5B, 5C:
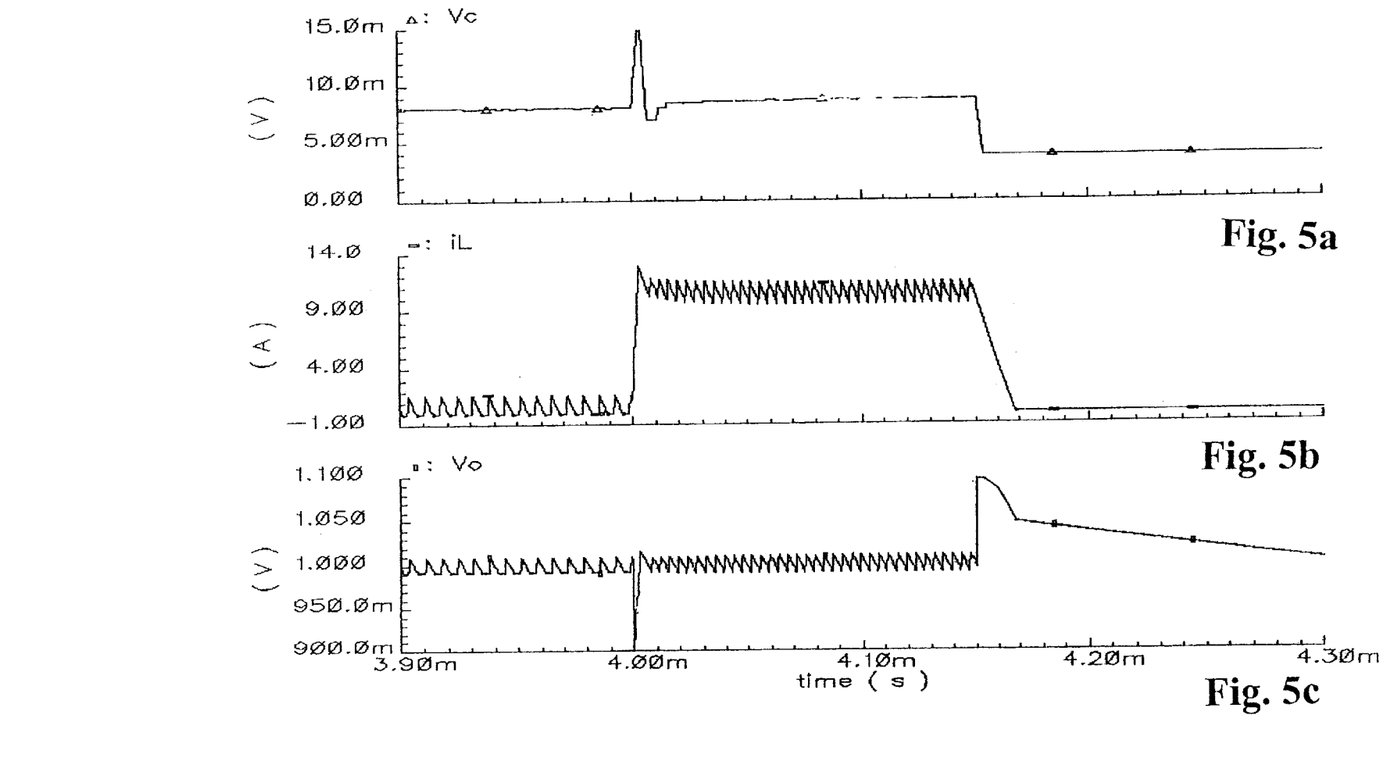
FIGS. 5A, 5B and 5C show graphs, respectively of the hysteresis range control voltage Vc, the load current IL, and the output voltage Vo, all plotted against the same time base, for the switching regulator of FIG. 1 when under a low-load condition.

The control circuit of this invention allows a situation of the load being very low to be handled with ease. In this case, the current in the inductor IL is zero and tends to turn negative during the half-cycle when the transistor HS is 'off' and the transistor LS is 'on'.

The zero-crossing comparator 9 senses this circumstance, and turns off the transistor LS as required by the specifications for pulse skipping attenuation.

Both LS and HS stay 'off' (at current IL=0) until the output voltage Vo falls below the lower threshold (Vref−Vh/2) of the comparator 7, thus causing the transistor HS to be turned on.

During this time interval, the logic gate P1 will inhibit the charge pump 10 from being discharged. For charge balance, the time interval when the current IL is above zero (with HS or LS 'on') should equal Ts.

The control voltage Vc to the charge pump 10 has the same value as during normal operation, whereas the time interval when IL=0 depends on the load current.

The solution proposed by the invention might reveal some frequency instability during the load transients. In fact, frequency will rise above its steady-state value as soon as the output voltage Vo is brought back within the hysteresis range; subsequently to this, frequency will come down and then climb back to its steady-state value. This behavior will not be experienced during normal circuit operation and can only occur when duty cycle is very low (or when it approaches one).

This control circuit thus generally performs to solve the technical problems of the prior circuits and allows the width of the oscillation band of the hysteresis comparator incorporated in the switching regulator to be adjusted in an adaptative fashion.

This is effectively achieved by a circuit design which is most simple to implement and requires but a small circuit area.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A control circuit for a hysteretic switching voltage regulator, comprising:
   a logic circuit driving an output stage;
   a hysteresis comparator comparing the voltage value at the output of the regulator with a reference voltage;
   a current sensor for sensing, through a comparator, the current drain of a load connected to the output of the regulator;
   a device for adjusting the hysteresis range of said hysteresis comparator; and
   a hysteresis frequency sensing and controlling logic portion connected to the output of said hysteresis comparator, said logic portion being arranged to act on said hysteresis range adjusting device.

2. The control circuit according to claim 1 wherein said frequency adjusting device is a charge pump having plural control inputs.

3. The control circuit according to claim 2 wherein said charge pump is constructed with a number of normally open controlled switches, each corresponding to one of said inputs, operative to communicate a respective one of current generators to the charge pump at a center circuit node N thereof.

4. The control circuit according to claim 2 wherein a control voltage output from said charge pump is applied to said hysteresis comparator.

5. The control circuit according to claim 1 wherein said sensing/controlling logic portion comprises a memory element being input the output signal from said hysteresis comparator and having a pair of conjugated outputs connected to respective control inputs of said frequency adjusting device.

6. The control circuit according to claim 5 wherein monostable elements, each having a delay period Ts, are connected between said conjugated outputs and respective inputs of the frequency adjusting device.

7. The control circuit according to claim 1 wherein said sensing/controlling logic portion comprises a logic gate being input the output signal from said hysteresis comparator and an output signal from said comparator to sense the load current drain.

8. The control circuit according to claim 7 wherein the output from said logic gate is applied directly to an input of said frequency adjusting device.

9. The control circuit according to claim 7 wherein the output signal from said hysteresis comparator is applied to an input of said logic gate through a monostable element having a delay period T3.

10. The control circuit according to claim 9 wherein the delay period T3 is longer than the delay period Ts.

11. A constant-frequency control circuit for controlling a switching voltage regulator, the control circuit comprising:
   a means for driving an output stage;
   a means for comparing a voltage value at an output of the regulator with a reference voltage;
   a means for sensing a current drain of a load connected to the output of the regulator;
   a means for adjusting an oscillation frequency of the voltage value comparing means; and
   a means for sensing and controlling an output of the comparing means by acting on the oscillation frequency adjusting means.

12. The control circuit according to claim 11 wherein the sensing and controlling means acts through a means for comparing to a threshold value a current drain of a load connected across the regulator output.

13. The control circuit according to claim 12 wherein the sensing and controlling means includes a logic gate receiving an output signal from the voltage value comparing means and an output signal from the load current drain comparing means to sense the load current drain.

14. The control circuit according to claim 13 wherein the output from the logic gate is applied directly to an input of the oscillation frequency adjusting means.

15. The control circuit according to claim 11 wherein the sensing and controlling means includes a memory means receiving an output of the voltage value comparing means and having a pair of matched outputs connected to respective control inputs of the oscillation frequency adjusting means.

16. The control circuit according to claim 15 wherein monostable elements, each having a first delay period, are connected between the matched outputs and respective inputs of the oscillation frequency adjusting means.

17. The control circuit according to claim 16 wherein the output signal from the voltage value comparing means is applied to an input of the logic gate through a monostable element having a second delay period.

18. The control circuit according to claim 17 wherein the second delay period is longer than the first delay period.

19. The control circuit according to claim 11 wherein the oscillation frequency adjusting means includes a plurality of inputs and is constructed with a number of normally open controlled switches, each corresponding to one of the inputs and operative to communicate a respective one of a plurality of current generators to the oscillation frequency adjusting means at a common node thereof.

20. The control circuit according to claim 11 wherein a control voltage output from the oscillation frequency adjusting means is applied to the voltage value comparing means.

21. A regulator comprising:
   an output stage having a high-side power transistor and a low-side power transistor connected in series with each other between a first and a second voltage reference and having a node interconnected therebetween;
   a logic circuit having a plurality of control outputs;
   first and second drivers for the respective high-side and low-side transistors of the output stage, the first and second drivers each connected to a corresponding one of the logic circuit control outputs, the first driver further connected to the node between the high-side and low-side transistors and receiving one of the control outputs and having an output connected directly to the gate terminal of the high-side transistor, the second driver receiving one of the control outputs and having an output connected directly to the gate terminal of the low-side transistor;
   a bootstrap capacitor coupled between the first supply voltage reference and the node;
   a diode connected in parallel with the low-side transistor, between the node and ground;
   an inductor and a sense resistor connected in series between the node and an output terminal of the regulator for sensing a current absorbed by an external load connected to the regulator output;
   a filter capacitor having a parasitic resistance connected between the output terminal and the ground;
   a hysteresis comparator having a first input connected to the output terminal of the regulator and a second input arranged to receive a third reference voltage for comparison of the output voltage value from the regulator with the third reference voltage, and having an output applied to an input of the logic circuit;
   a pair of comparators arranged to report a respective rising above an upper threshold and falling below a lower threshold of a current drain of the external load, and each of the comparators having first and second input signals derived from the ends of the sense resistor and an output signal connected to a corresponding input of the logic circuit;
   a device for adjusting an oscillation frequency of the hysteresis comparator, the oscillation frequency adjusting device having a plurality of control inputs, and a control output coupled to act on the hysteresis comparator; and
   a logic portion having:
      a logic gate and a set of memory elements for sensing and controlling a working frequency of the hysteresis comparator, the logic gate having a first input for receiving the output signal through an inverter of the one of the pair of comparators arranged to report the falling below the lower threshold of the current drain of the external load and a second input for receiving the output signal of the hysteresis comparator via a first monostable element, the logic gate supplying an output connected to a first input the oscillation frequency adjusting device for depressing a value of a current in the oscillation frequency adjusting device, and
      a bistable memory element coupled to receive the output from the hysteresis comparator, the element having a first output connected to a second input of the oscillation frequency adjusting device through a second monostable element and a second output being the inverted signal of the first output and connected to a third input of the oscillation frequency adjusting device through a third monostable element, wherein a control signal received on one of the second and third inputs is effective to integrate the current in the oscillation frequency adjusting device.

22. The regulator of claim 21 wherein the first voltage reference is a supply voltage reference and the second voltage reference is a ground voltage reference.

23. The regulator of claim 21 wherein the first and second drivers are amplification circuit portions whereby each respective control terminal of the high-side and low-side power transistors can be driven.

24. The regulator of claim 21 wherein the diode connected in parallel with the low-side transistor is a Schottky diode.

25. The regulator of claim 21 wherein the upper threshold of a current drain of the external load corresponds to a maximum of the current drain of the external load; and lower threshold of the current drain current drain of the external load corresponds to a minimum current drain of the external load.

26. The regulator of claim 21 wherein the one of the pair of comparators having an output signal coupled to the first input of the logic gate through an inverter is a zero-crossing type comparator.

27. The regulator of claim 21 wherein the device for adjusting the oscillation frequency of the hysteresis comparator is a charge pump.

28. The regulator of claim 21 wherein the output of the oscillation frequency adjusting device is a control voltage applied to the hysteresis comparator.

29. The regulator of claim 21 wherein the second monostable element and the third monostable element of the bistable memory element each have a delay period associated therewith.

30. The regulator of claim 21 wherein the first monostable element coupled between the output of the hysteresis comparator and the input of the logic gate has a delay period associated therewith.

31. The regulator of claim 21 wherein a delay period associated with the first monostable element coupled between the output of the hysteresis comparator and the input of the logic gate is greater than a delay period associated with each of the second and the third monostable elements of the bistable memory element.

32. The regulator of claim 21 wherein the logic gate is a two-input AND gate.

33. A method for controlling a switching voltage regulator, the method comprising:

driving an output stage;

comparing a voltage value at an output of the regulator with a reference voltage;

sensing a current drain of a load connected to the output of the regulator;

adjusting an oscillation frequency of a device for comparing the voltage value; and sensing and controlling an output of the device for comparing the voltage value by acting on a device for adjusting the oscillation frequency.

34. The method according to claim 33 wherein the sensing and controlling includes comparing to a threshold value a current drain of a load connected across the regulator output.

35. The method according to claim 34 wherein the sensing and controlling includes sensing the load current drain by receiving an output signal generated by the comparing a voltage value at an output of the regulator with a reference voltage and an output signal generated by the comparing to a threshold value a current drain of a load connected across the regulator output.

36. The method according to claim 35 wherein an output generated by the sensing and controlling is applied directly to the device for adjusting the oscillation frequency.

37. The method according to claim 33 wherein the sensing and controlling includes receiving in a memory an output generated by the sensing and controlling and selectively outputting a pair of matched outputs to respective control inputs of the device for adjusting the oscillation frequency.

38. The method according to claim 37 wherein monostable elements, each having a first delay period, are connected between the matched outputs and the respective inputs of the device for adjusting the oscillation frequency.

39. The method according to claim 38 wherein the output signal from the comparing the voltage value at the output of the regulator with a reference voltage is applied through a monostable element having a second delay period to an input of a logic gate operating the sensing and controlling.

40. The method according to claim 39 wherein the second delay period is longer than the first delay period.

41. The method according to claim 33 wherein the device for adjusting the oscillation frequency includes a plurality of inputs and is constructed with a number of normally open controlled switches, each corresponding to one of the inputs and operative to communicate a respective one of a plurality of current generators at a common node.

42. The method according to claim 33 wherein a control voltage output from a device for adjusting the oscillation frequency is applied to a device for operating the comparing of a voltage value at an output of the regulator with a reference voltage.

* * * * *